(12) United States Patent
Reams, III et al.

(10) Patent No.: US 7,987,493 B1
(45) Date of Patent: Jul. 26, 2011

(54) METHOD AND SYSTEM FOR MITIGATING DISTRIBUTED DENIAL OF SERVICE ATTACKS USING CENTRALIZED MANAGEMENT

(75) Inventors: Orin Paul Reams, III, Charles Town, WV (US); Travis Edwards Dawson, San Mateo, CA (US); David Shearer Moyle, Gainesville, VA (US); Ryan Charles McDowell, Herndon, VA (US); David Paul Bannister, Gainesville, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1102 days.

(21) Appl. No.: 11/183,581

(22) Filed: Jul. 18, 2005

(51) Int. Cl.
  *G06F 17/00* (2006.01)
(52) U.S. Cl. ......................................................... 726/1
(58) Field of Classification Search .................... 726/1
  See application file for complete search history.

(56) References Cited

U.S. PATENT DOCUMENTS

| | | | |
|---|---|---|---|
| 7,596,808 B1 * | 9/2009 | Wilkinson et al. | 726/22 |
| 7,657,939 B2 * | 2/2010 | Strauss et al. | 726/23 |
| 2003/0046577 A1 * | 3/2003 | Silverman | 713/200 |
| 2004/0037326 A1 * | 2/2004 | D'Souza et al. | 370/516 |
| 2004/0103211 A1 * | 5/2004 | Jackson et al. | 709/244 |
| 2004/0128550 A1 * | 7/2004 | Govindarajan et al. | 713/201 |
| 2004/0148520 A1 * | 7/2004 | Talpade et al. | 713/201 |
| 2005/0050364 A1 * | 3/2005 | Feng | 713/201 |
| 2005/0154733 A1 * | 7/2005 | Meltzer et al. | 707/10 |
| 2006/0010389 A1 * | 1/2006 | Rooney et al. | 715/736 |
| 2006/0031483 A1 * | 2/2006 | Lund et al. | 709/224 |
| 2006/0236402 A1 * | 10/2006 | Russell et al. | 726/25 |
| 2006/0242705 A1 * | 10/2006 | Sadhasivam et al. | 726/23 |
| 2006/0272018 A1 * | 11/2006 | Fouant | 726/23 |

OTHER PUBLICATIONS

Cisco Systems, Inc.; Cisco Guard XT 5650 Data Sheet; 1992-2004—article; pp. 1 of 7.
Prolexic Technologies, Inc.; the global leader in DDoS protection; 2003-2004; Internet article; pp. 1-4.
Radware, Inc.; Application Note: Radware Solutations for Carriers; Dec. 3, 2003; article; pp. 1-32.
Mazu Networks; Mazu Enforcer tm, an overview; Mar. 2004 Cambridge, MA; articles; pp. 1-13.
D-Ward Project Home Page; D-WARD: DDoS Network Attack Recognition and Defense; Mar. 11, 2005; article; pp. 1-2.
Captus Network; A Captus Networks White Paper; Protecting the Network from Denial of Service Attacks: The Captus Networks TRaP Technology tm; Aug. 2001 v6.2; article; pp. 1-9.
CloudShield Technologies; CloudShield Go Deep; Open Platforms for High Speed Networks Serv.; 2003; article; pp. 1-12.
Riverhead Networks; Riverhead Traffic Anomaly Solutions; Oct. 17, 2003; article; pp. 1-48.

(Continued)

*Primary Examiner* — Nasser Moazzami
*Assistant Examiner* — Michael S McNally

(57) ABSTRACT

The present invention provides a method and system for mitigating distributed denial of service (DDoS) attacks using central management and shared resources. The present invention implements a shared model for mitigating devices distributed in a packet network to mitigate a DoS attack. Mitigating devices are distributed in the packet network to support different network devices during a DoS attack. Configuration information is loaded dynamically into the mitigating devices to adjust the mitigation effort to different network devices. The present invention also implements a shared model for detecting devices distributed in the packet network to detect the presence of a DoS attack. Baselines are created to distinguish between valid packets and invalid packets. When invalid packets are detected, a notification occurs to other devices or a central management system.

30 Claims, 8 Drawing Sheets

OTHER PUBLICATIONS

Riverhead Networks, Inc.; Centralized Protection for Service Providers; Riverhead Press Release; Aug. 25, 2003; Internet articles; pp. 1-20.

ARBOR Networks; Service Provider Infractructure Security; Rob Thomas; Cisco; 2001-2003; pp. 1-14.

Optimal NetFlow and CMON Deployment in IP Networks; Sprint Advanced Technology Laboratories; Hui Zang; Research report/ Nov. 2004; pp. 1-20.

Sprint ATL; Sprint Research Report RR03-ATL-083177; DDoS Mitigation via Regional Cleaning Centers; Sharad Agarwal; Travis Dawson; Christos Tryfonas; Aug. 2003; pp. 1-14.

Reams, Orin, IP Defender Network Detailed Design Document, Feb. 21, 2005.

Reams, Orin Paul III, Declaration Under 37 C.F.R. § 1.131, May 1, 2008.

Office Action mailed Mar. 24, 2009 in U.S. Appl. No. 11/294,979, filed Dec. 6, 2005.

* cited by examiner

METHOD AND SYSTEM FOR MITIGATING DISTRIBUTED DENIAL OF SERVICE ATTACKS USING CENTRALIZED MANAGEMENT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Not applicable.

BACKGROUND OF THE INVENTION

Denial of service (DoS) and distributed denial of service (DDoS) attacks are serious problems occurring for service providers and businesses operating equipment in a packet network. The problems can arise when Realtime Transport Protocol (RTP) is being implemented but may arise with other protocols operating in the packet network.

RTP is a protocol implemented to carry content in a packet network. The content may be audio, video, or other media in packet form. RTP packets move across the packet network in data streams from one endpoint to another. These RTP streams contain timestamp and sequence number fields in each RTP packet. Each RTP packet may be uniquely identified by a timestamp and sequence number. As an RTP stream progress, the timestamp and sequence number fields in each RTP packet typically increment in a predictable pattern. Several things may influence the predictable pattern including, but not limited to, the type of codec in use.

One of the drawbacks to RTP is that it allows flexibility in determining what is an acceptable RTP packet based on its timestamp and sequence number fields. Variations in the timestamp and sequence number fields are allowed in RTP which may lead to invalid packets being allowed in the packet network.

One issue that is not adequately addressed within the art concerns denial of service (DoS). One exemplary DoS attack utilizes a hostile machine creating forged (spoofed) messages that appear to originate from legitimate senders. The hostile machine sends the spoofed messages to a targeted destination. With a sufficiently large number of spoofed messages, the target's phone (or data) services become clogged and rendered inoperable.

A successful DoS attack may result in crashing a particular element. When dealing with a phone, the phone may no longer accepts user input and no longer be unusable. Furthermore, the element may enter a reboot cycle as a result of the DoS attack and/or the element may require manual intervention to bring the element back online. Successful DoS attacks may also result in the inability of the element to process additional calls since the element is flooded with malicious messages and cannot process valid messages. Thus, the DoS attack makes service unavailable to legitimate users, who will typically experience a busy signal or "dead air." Finally, a successful DoS attack often results in degradation in the voice quality of the service. This degradation is due, in part, to a decrease in available band-width and processor resources.

Even more dangerous than DoS attacks are distributed DDoS attacks. DDoS attacks are more malicious since an attack on a targeted element may originate from several sources simultaneously. The objective is to flood the targeted element with malicious or invalid packets to achieve the same goal as discussed above for an ordinary DoS attack. The targeted element becomes overwhelmed with malicious or invalid packets to the point where it ceases operation or go into an initialization phase.

Some businesses have implemented techniques to reduce DoS and DDoS attacks, which shall be referred together as DoS attacks, by implementing mitigating equipment that can evaluate a packet and determine if the packet is malicious or invalid. This mitigating equipment is dedicated to business either by being configured by a service provider or purchased directly by the business.

The mitigating equipment is usually loaded with configuration information for the business/customer that needs the protection. Since the mitigating equipment can process (or evaluate) packets in the gigabyte range, an implementer has to determine how many mitigating equipments are needed for a particular customer. This involves a guessing game since it is difficult to estimate the volume of malicious or invalid packets that may be directed towards the customer when a DoS attack occurs. Once the configuration information is loaded into the mitigating equipment and installed in the packet network, it must be monitored to insure that the customer has sufficient protection. If changes are needed, they must be made manually to the mitigating equipment. If the capacity of one mitigating equipment is exceeded, additional mitigating equipment must be installed or purchased for the customer.

The unfortunate aspect of the dedicated solution described above is that if a second customer experiences a DoS attack, the second customer cannot use the first customer's mitigating equipment. As discussed above, the first customer's mitigating equipment is dedicated only to the first customer with configuration information corresponding to the first customer. Another unfortunate aspect is that when the packet traffic is normal, cost is wasted by having idle mitigating equipment sitting in the packet network dedicated to one customer. With this configuration, some customers may be hesitant to take on the cost of purchasing mitigating equipment when the equipment may sit idle in the packet network for extended periods of time. However, there is a danger of the customer not having adequate protection from a potential DoS attack if they do not have the protection of mitigating equipment. Therefore, customers have a dilemma as to whether to invest significant monies into purchasing DoS protection or to take a gamble that their equipment may not incur a DoS attack.

A solution is needed to reduce malicious DoS attacks in the packet network that would allow customers or businesses to share mitigating equipment and potentially share costs associated with implementing the mitigating equipment. The solution needs to protect various customers or businesses from malicious or invalid packets whether the attack is a DoS or DDoS type.

SUMMARY OF THE INVENTION

This disclosure describes, among other things, a method and system for mitigating distributed denial of service (DDoS) attacks using central management and shared resources. The present invention implements a shared model for mitigating devices distributed in a packet network to mitigate a DoS attack. Mitigating devices are distributed in the packet network to support different network devices during a DoS attack. Configuration information is loaded dynamically into the mitigating devices to adjust the mitigation effort to different network devices. The present invention also implements a shared model for detecting devices distributed in the packet network to detect the presence of a DoS attack. Baselines are created to distinguish between valid packets and invalid packets. When invalid packets are detected, a notification occurs to other devices or a central management system.

In accordance with the present invention, a method for mitigating distributed denial of service (DoS) attacks among network elements is provided that includes deploying DoS mitigating devices in the packet network in a distributed manner to intercept DoS traffic to mitigate DoS attacks to network elements operating in the packet network. A user-configurable policy is provided for each network element to the mitigating devices to establish an amount of mitigation to occur for each network element when a DoS attack occurs. The amount of mitigation is adjusted to the DoS attack for each network element based on the adjustment of the user-configurable policy stored in the mitigating devices. When detected in the packet network, DoS attacks are mitigated to the network elements by the mitigating devices in accordance with the user-configurable policies.

In another aspect, a method for sharing DoS mitigation resources among network elements is provided that includes providing central devices to communicate information about network elements to mitigating devices distributed across a packet network. Mitigating devices receive communications to mitigate DoS attacks to the network elements. Instructions are sent to the mitigating devices to adjust information stored in the mitigating devices to change an amount of mitigation provided by the mitigating devices to the network elements.

In yet another aspect, a method for notification of a DoS attack is provided that includes providing central devices to communicate information about network elements to detecting devices distributed across a packet network. Baselines of valid traffic are established for network elements based on a sampling of network traffic at the network elements. Information is received at the central devices from the detecting devices about network traffic that does not fit the baseline occurring at the network elements.

In yet another aspect, a method for notification of a DoS attack is provided that includes providing central devices to communicate information about network elements to detecting devices distributed across a packet network. Network traffic is sampled at the network elements to establish a baseline of valid traffic for each network element. Network traffic is detected that does not fit the baseline by the one or more detecting devices. Information is provided to the central devices that the network elements are encountering network traffic that does not fit the baseline.

In yet another aspect, a system for mitigating distributed DoS attacks among network elements is provided that includes a DoS mitigating device operable in a packet network to intercept DoS traffic to mitigate DoS attacks to one or more network elements, to store one or more user-configurable policies respectively for the one or more network elements, and to share a workload of mitigating DoS attacks with one or more other DoS mitigating devices.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1:
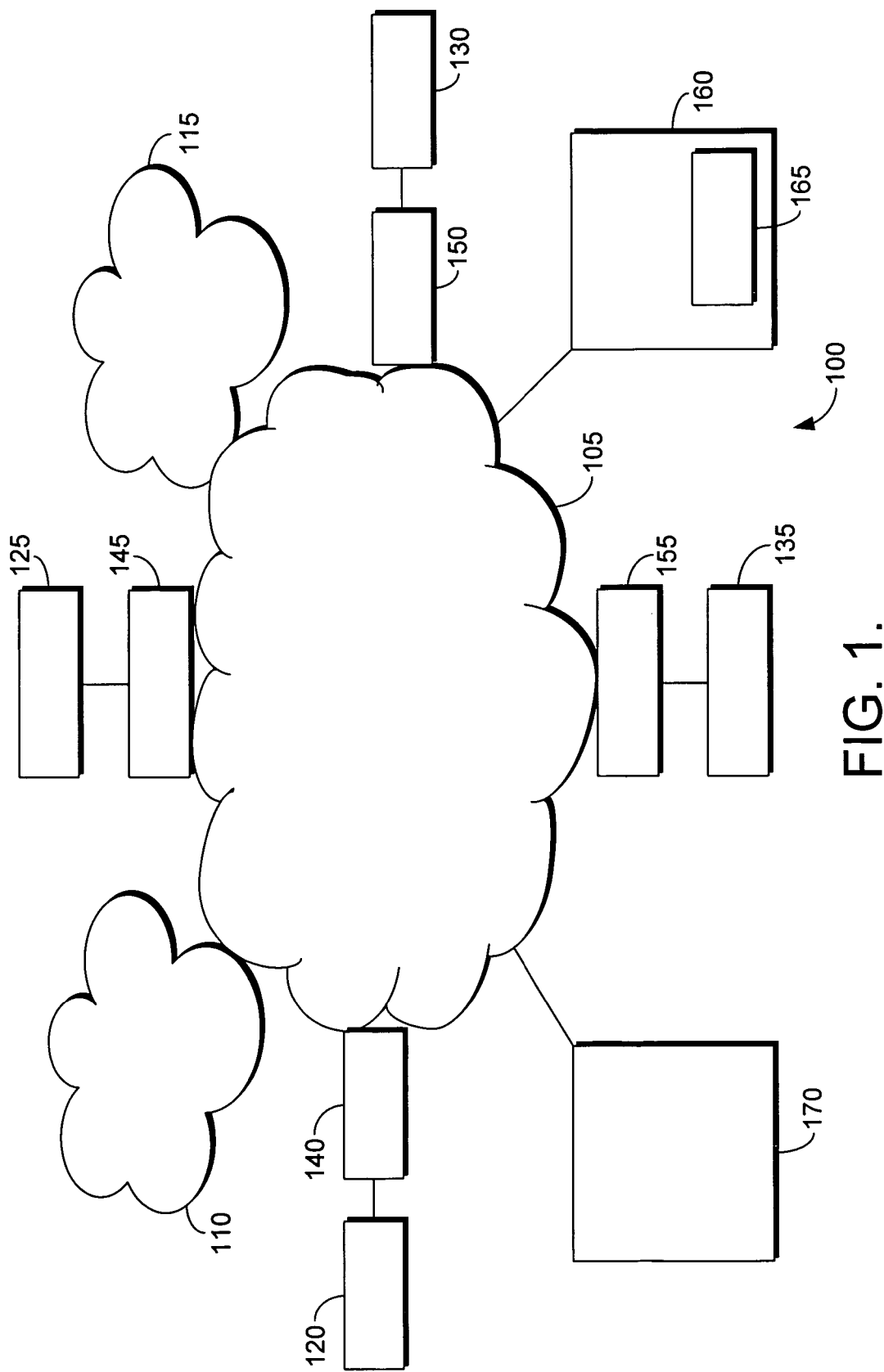
FIG. 1 is a first block diagram of an exemplary operating environment in accordance with an embodiment of the present invention.

The present invention will be better understood from the detailed description provided below and from the accompanying drawings of various embodiments of the invention, which describe, for example, method and system for mitigating DDoS attacks using centralized management. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

Mitigation of Distributed Denial of Service Attacks Using Centralized Management and Shared Resources An embodiment of the present invention implements a method to use several devices located throughout a network to mitigate DoS attacks to customers. The devices are not dedicated to one customer but are shared in order to improve availability of resources. The devices may be dynamically configured from a central location to focus mitigation effort to different customers. Also, the present invention implements a method to use several devices to detect the presence of a DoS attack and provide a central location to receive notification of the DoS attack. When received at the central location, remedial measures may be taken in response to the DoS attack.

Please note that the acronyms DoS and DDoS appear throughout the specification. The acronym DoS will be used in most instances to denote both DoS and DDoS situations. When the need arises, a specific reference shall be made to DDoS when a distinction needs to be made from an ordinary DoS situation as was done above.

In FIG. 1, a block diagram is shown of a network 100. Network 100 includes a private network 105; a public internet 110; a customer network 115; DoS mitigating devices 120, 125, 130, and 135; routers 140, 145, 150, and 155; a management center 160 with a central device 165; and a customer 170. Network 100 illustrates an exemplary operating environment of an embodiment of the present invention. The elements illustrated in the block diagram are meant to be exemplary of the present invention. Other embodiments may be implemented with other elements in accordance with the present invention.

As FIG. 1 shows, private network 105 is connected to public internet 110 and customer network 115. This connection is similar to many corporate environments as well as networks implemented by service providers. Typically, a business may have a private network with a connection to the internet as well as a connection to another business' network. Likewise, a service provider may provide a network focusing on particular services containing several customers. The service provider may have a private network with a connection to the Internet as well as a connection to customer networks.

In an operating environment, private network 105 has many devices connected to it and operating within it. In FIG. 1, some of those devices are shown as DoS mitigating devices 120, 125, 130, and 135; and routers 140, 145, 150, and 155. Each device may communicate with other devices through the use of protocols and routing schemes in the form of packets which are not shown. In addition, private network 105 may have several customers which are shown in FIG. 1, such as customer network 115 and customer 170.

DoS mitigating devices 120, 125, 130, and 135 may be computing devices including, but not limited to, servers, computers, workstations, and network protection systems. DoS mitigating devices 120, 125, 130, and 135 have the ability to process large amounts of traffic, such as traffic in the multi-gigabit rate. DoS mitigating devices 120, 125, 130, and 135 are used to reduce an ordinary DoS attack including a DDoS attack. For example, when an attack occurs to a customer, packets are diverted to a DoS mitigating device to be cleaned of malicious (or invalid) packets. DoS mitigating devices 120, 125, 130, and 135 may be a commercial product that can be procured from a number of commercial vendors.

In the present invention, the DoS mitigating devices are not dedicated to a particular customer. The DoS mitigating devices are distributed across private network 105 to provide coverage of the network in case of a DoS attack by covering various customers that may be affected by a DoS attack. Rather than have a DoS mitigating device dedicated to one customer, several customers share several DoS mitigating devices. In this way, a DoS mitigating device may be manipulated to support different customers with different needs when a DoS attack occurs.

As discussed earlier, communication between the various devices in private network 105 may occur with packets. These packets may be directed to various devices using routers located throughout network 100. In FIG. 1, a few of those routers are shown for illustrative purposes as routers 140, 145, 150, and 155. A router is a device that determines where to forward packets enroute to a particular destination.

Customer 170 is indicative of a customer that may be connected to private network 105. Customer 170 may include various devices including routers, switches, computers, servers, workstations, and firewalls which are not shown.

Management center 160 may be implemented to communicate with various customers connected to private network 105, or it may be implemented to monitor or control devices operating in private network 105. Management center 160 may include routers, servers, other devices, and central device 165. Central device 165 may be a computer, server, or a DoS mitigating device as well. However, central device 165 may operate to communicate with various devices in packet network 105. As a DoS mitigating device, central device 165 may be used as a master element to store configuration or profile information on the customers connected to private network 105. In this way, in the event of a DoS attack, central device 165 may transfer information to DoS mitigating devices 120, 125, 130, and 135 instructing them as to the amount of mitigation to provide to each customer and the duration to perform the mitigation. A feedback loop may be provided to central device 165 using other devices connected to management center 160. In this way, central device 165 may provide dynamic instructions to DoS mitigating devices 120, 125, 130, and 135 to support customers as the DoS attack changes but also receive updates as to the progress of the mitigation activities. With the updates, additional instructions may be provided consistent with the level of need for each customer.

As a computer or server, central device 165 may receive information from several DoS detecting devices when a DoS attack occurs. Although the DoS detecting devices are not shown in the figures, DoS detecting devices may be placed throughout private network 105 and customer network 115 to analyze packets for the presence of a DoS attack. When a DoS attack occurs, a DoS detecting device may operate with other devices to provide a notification to central device 165. Central device 165 and management center 160 may act as the central repository for notification information regarding DoS attacks. Subsequently, central device 165 and management center 160 may institute remedial measures to stop the DoS attack. Such measures may include providing further notification including alarms, alerts, or messages. In addition, as discussed above, DoS mitigating devices may be instructed to mitigate the DoS attack. Given the flexibility in implementing various embodiments of the present invention, a DoS mitigating device may function as a DoS detecting device and vice versa.

Figure 2:
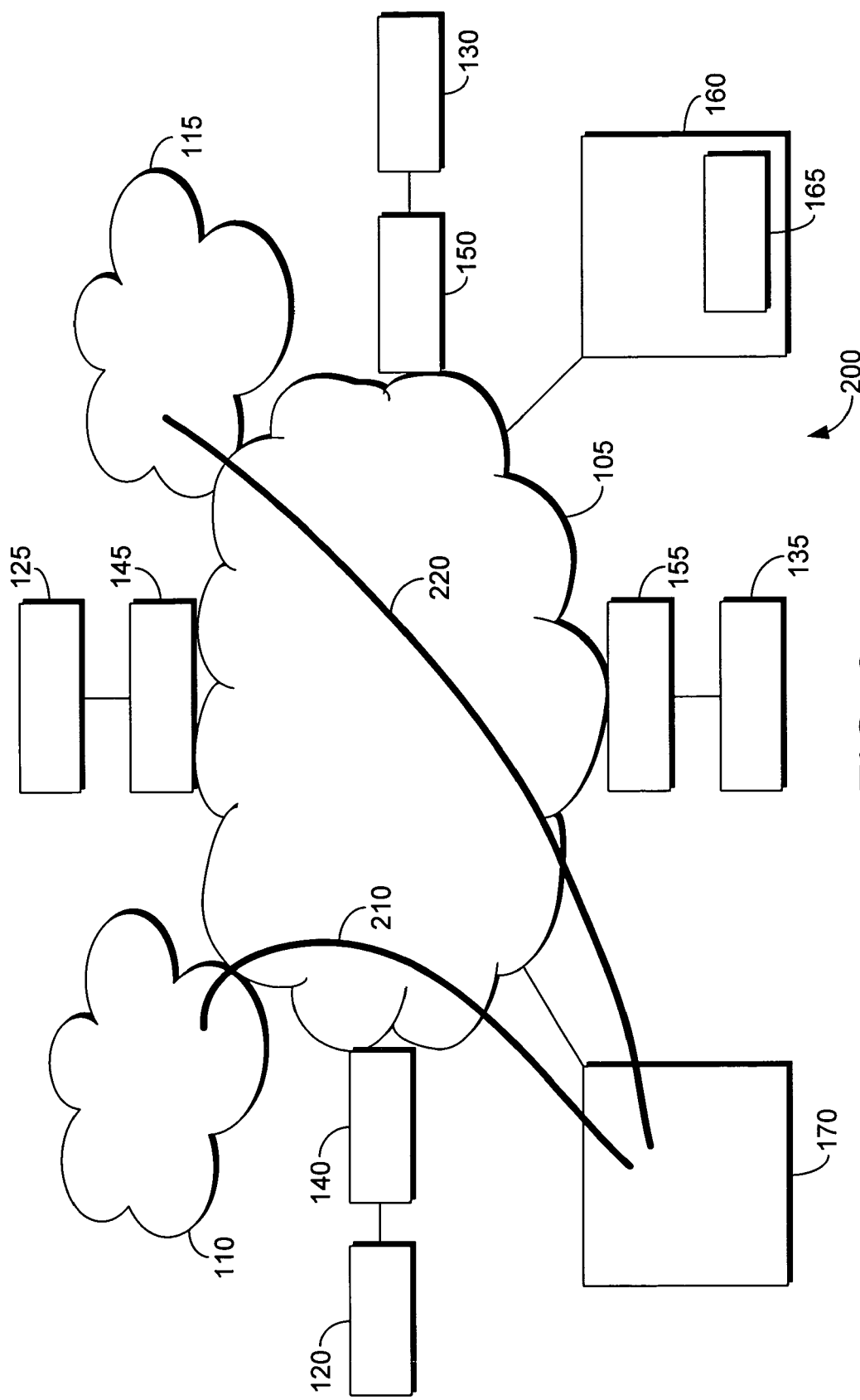
FIG. 2 is a second block diagram of an exemplary operating environment in accordance with an embodiment of the present invention.

Turning now to FIG. 2, the same network 100 as illustrated in FIG. 1 is shown but this time shows DoS attack packets 210 and 220. DoS attack packets 210 and 220 are malicious or invalid packets composed of legitimate-appearing requests. They may include large numbers of "zombies" and have spoofed identities making it impossible to identify and block these packets. The result of DoS attack packets is that a customer's network or number of devices may be paralyzed from operation. A device may become so overwhelmed at trying to process these invalid packets that it ceases operation. The origin of these attacks may begin anywhere but may result from disgruntled users or unscrupulous businesses targeting a specific site, device, or customer.

In FIG. 2, a DoS attack occurs that originates from public network 110 and customer network 115. This is the so-called DDoS scenario since the DoS attack originates from different locations attacking the same devices, location, or area. In this case, customer 170 is the target of the DoS attack. Although not shown, a packet may contain information that allows it to be routed to a particular destination. For example, an RTP packet will contain various information that may allow it be routed to a specific destination or device.

Figure 3:
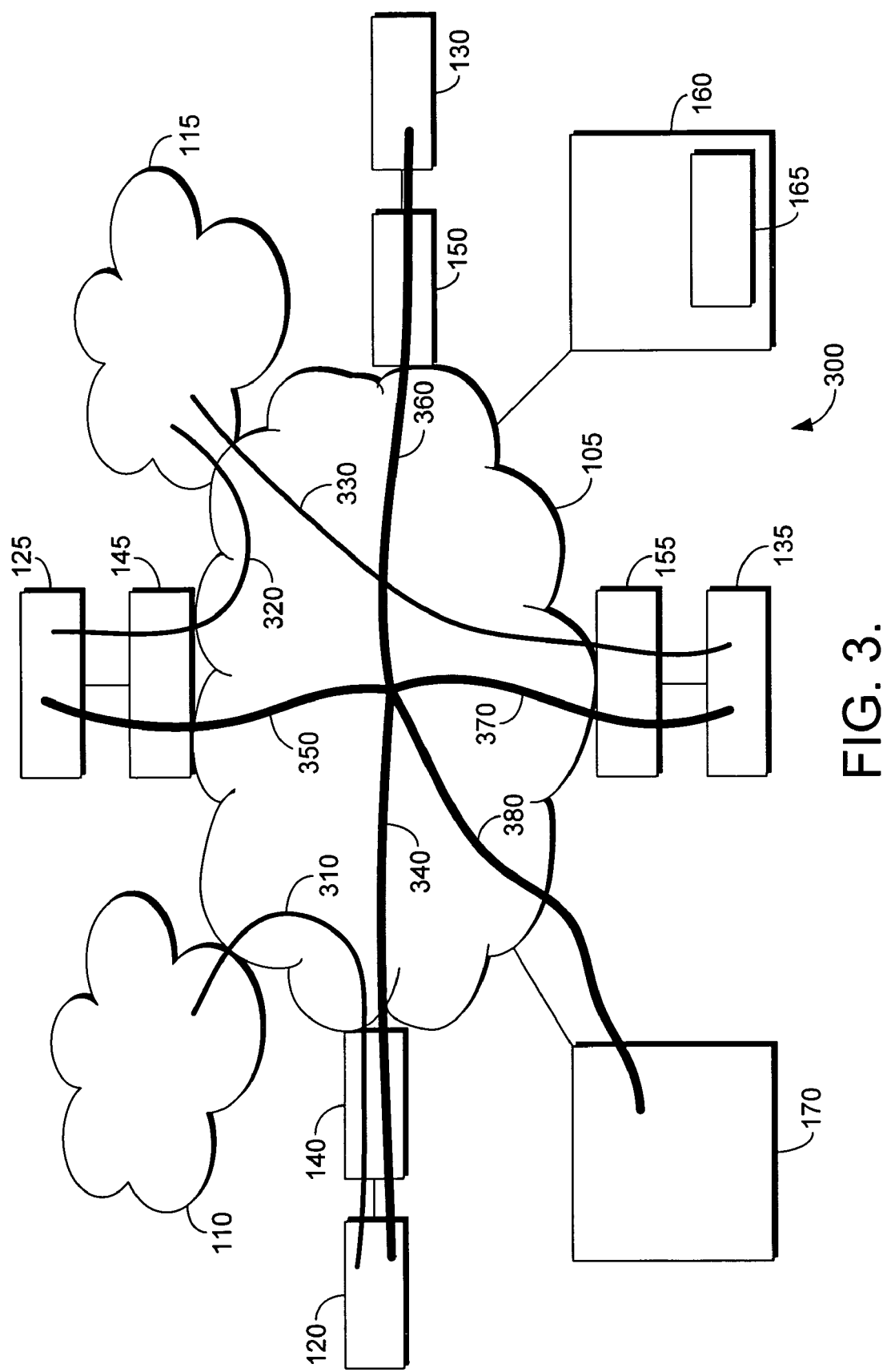
FIG. 3 is a third block diagram of an exemplary operating environment in accordance with an embodiment of the present invention.

Turning now to FIG. 3, an illustration is provided where central device 165 communicates with DoS mitigating devices 120, 125, 130, and 135 in the implementation of an embodiment of the present invention. As a DoS attack occurs, central device 165 may instruct one or several DoS mitigating devices to mitigate the DoS attack. As one may see in the illustration, DoS mitigating devices 120, 125, 130, and 135 and routers 140, 145, 150, and 155 work together with other devices not shown to re-route potentially malicious traffic to the DoS mitigating devices rather than allow the traffic to continue as shown in FIG. 2. DoS attack packet 210 in FIG. 2 is re-routed to become a DoS attack packet 310 in FIG. 3. Packets are re-routed through router 140 into DoS mitigating device 120 to be cleaned of malicious or invalid packets. DoS attack packet 220 in FIG. 2 is re-routed to become a DoS attack packet 320 and a DoS attack packet 330 in FIG. 3. The data stream is split because multiple DoS mitigating devices may be used to reduce the DoS attack. DoS attack packet 320 is re-routed through router 145 into DoS mitigating device 125 to be cleaned of malicious or invalid packets. DoS attack packet 330 is re-routed through router 155 into DoS mitigating device 135 to also be cleaned of malicious or invalid packets.

Once the packets are cleaned of malicious or invalid packets, the DoS mitigating devices may deliver cleaned packets to customer 170. This is illustrated by cleaned packets 340, 350, 360, 370, and 380. This re-routing of packets may occur for as long as pre-determined by a service provider or by pre-arranged agreements with the customers. Central device 165 may continue to provide instructions as to the amount of mitigation a DoS mitigating device may provide until the DoS attack subsides. When this happens, devices may return to normal operation whereby central device 165 instructs the DoS mitigating device to stop the mitigation and the routers re-configure to return traffic patterns to their normal state.

Figure 4:
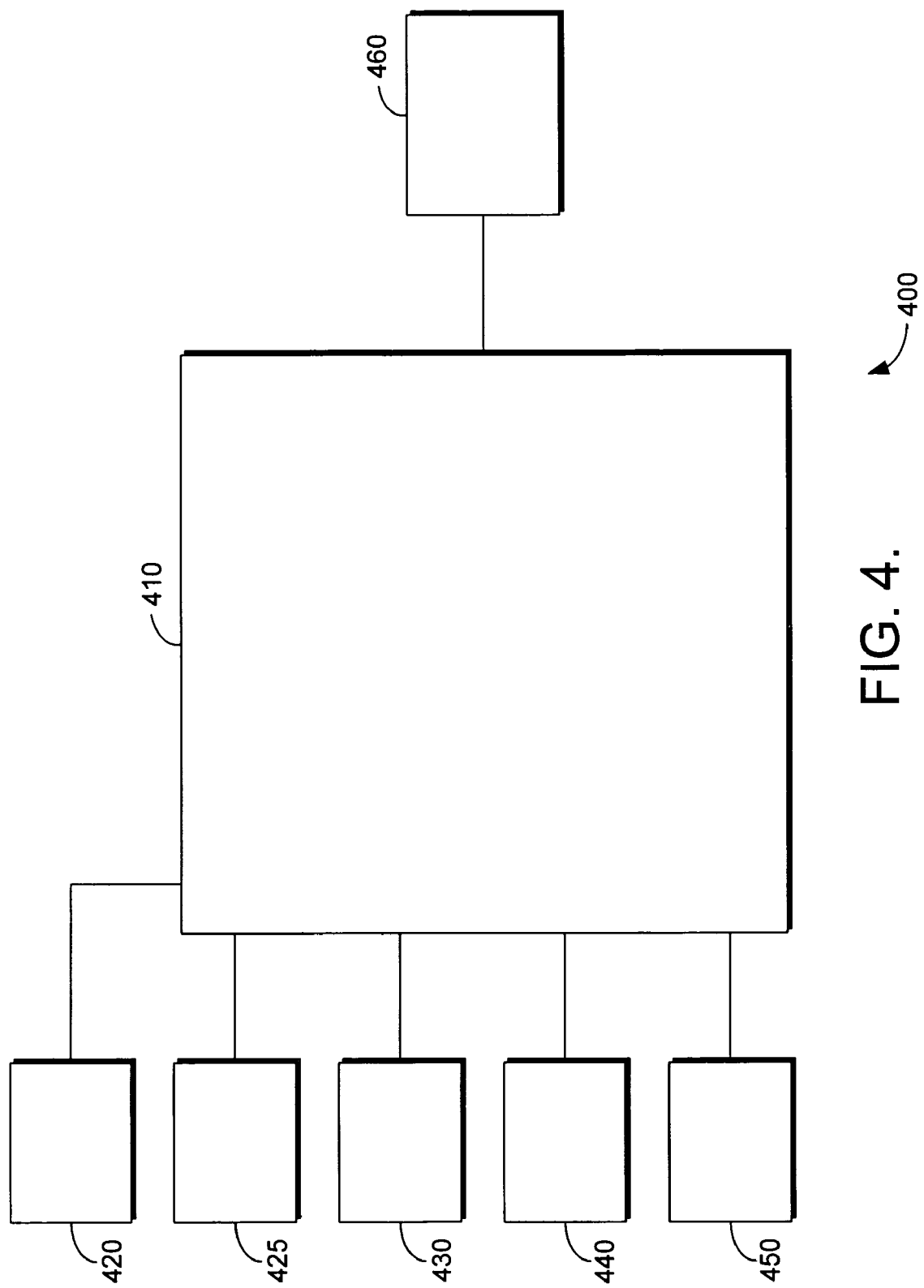
FIG. 4 is a block diagram of an exemplary connection of a DoS detecting device in accordance with an embodiment of the present invention.

In FIG. 4, a block diagram of a DoS detecting device 410 connected to a network operations center 420, a service delivery 425, a mitigating device 430, a status server 440, a log server 450, and an internet protocol (IP) traffic 460 is shown in 400. DoS detecting device 410 analyzes packets that passes through it. Packets may be analyzed to determine if a packet is considered malicious or invalid. In order to make this determination, an embodiment of the present invention may include creating a baseline of the type of packet traffic that flows to a customer, device, or location. An observation of the traffic may be made to create a profile or baseline determining a range of packets that may be considered valid. The profile or baseline may be communicated to network operations center 420, service delivery 425, or mitigating device 430 in order to have the information stored in a central location. The observation of traffic may be performed by DoS detecting device 410 or another device that is not shown. In addition, future packets that flow to DoS detecting device 410 may be analyzed against the baseline. Packets that do not meet the requirements of the baseline may be considered malicious or invalid. An implementer of the present invention may implement an embodiment whereby the baseline is intermittently re-created to reduce the potential of valid packets being considered malicious or invalid. There are times when network behavior or other impacts may change traffic patterns causing a shift in the baseline.

An embodiment of the present invention may implement DoS detecting device 410 as shown. Network operations center 420 may be provided to communicate configuration, baseline, and operation information to DoS detecting device 410. Service delivery 415 may be provided to communicate configuration, baseline and operation information to DoS detecting device 410. Network operations center 420 and service delivery 425 may be located in a network operations center such as management center 160. Mitigating device 430 may be provided to store master information such as original profiles and configurations. Mitigating device 430 may be the same as central device 165 depending on the implementation of the embodiment of the present invention. Status server 440 may be provided to convey status of various events. Log server 450 may be provided to track activities.

IP traffic 460 represents the flow of traffic to DoS detecting device 410. IP traffic 460 may be normal IP traffic of packets. It may also be malicious DDoS attack packets. IP traffic 460 includes packets routed to DoS detecting device 410 for analysis. As discussed earlier, the packets are analyzed to determine if malicious or invalid packets are being received. If so, the proper notification should occur through the workings of the various devices discussed above.

Figure 5:
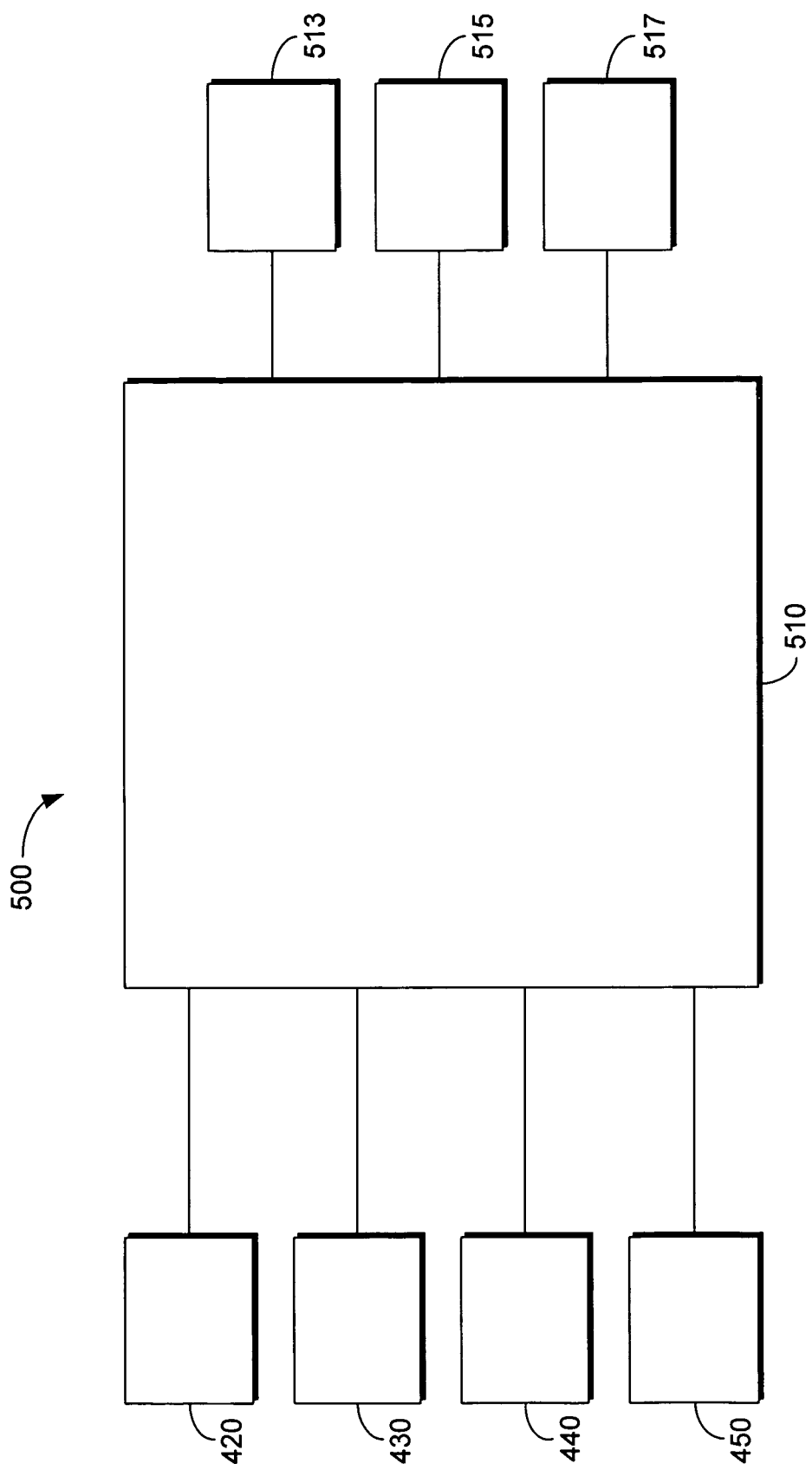
FIG. 5 is a block diagram of an exemplary connection of a DoS mitigating device in accordance with an embodiment of the present invention.
Figure 6:
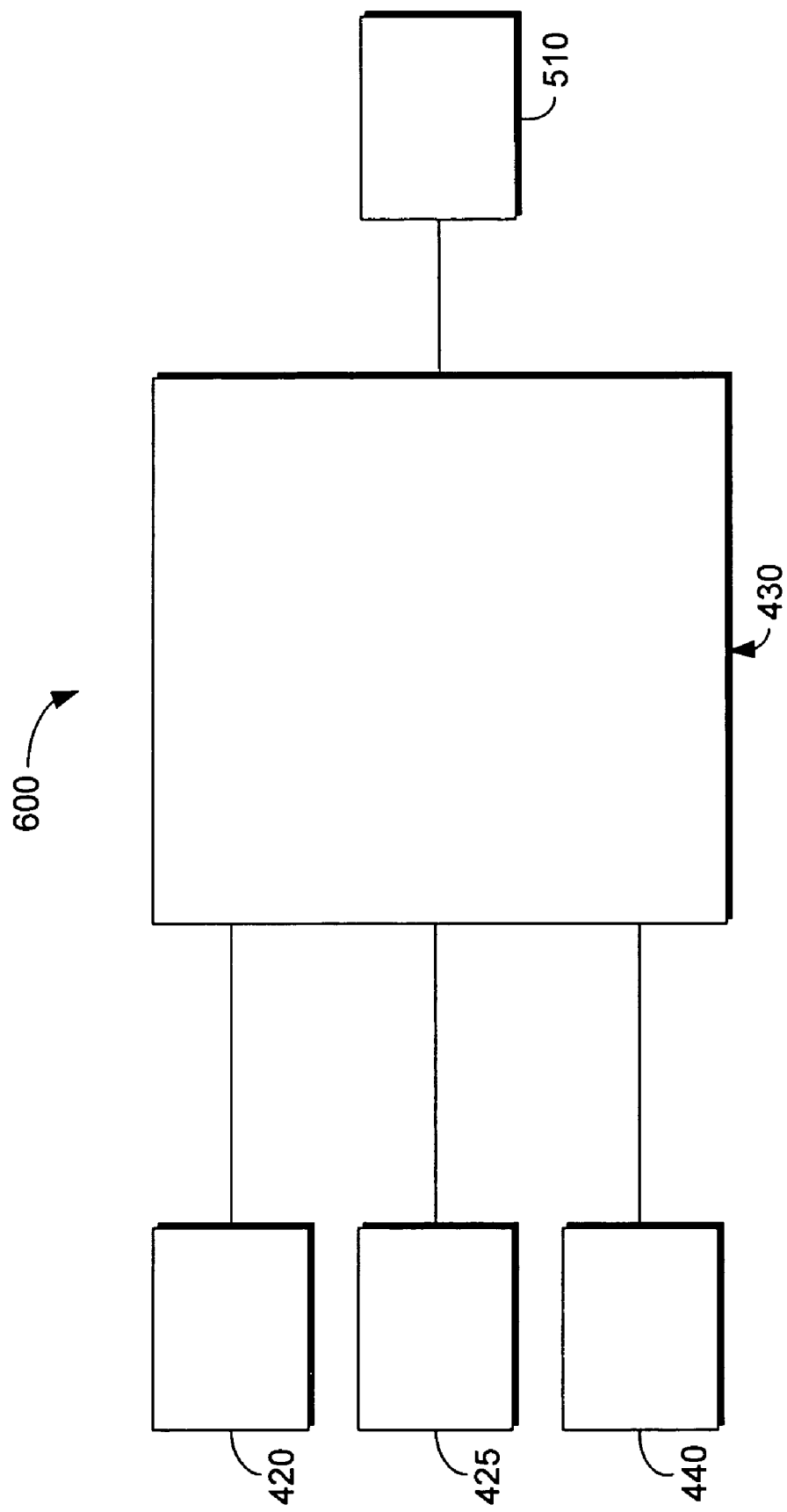
FIG. 6 is a block diagram of an exemplary connection of a central device in accordance with an embodiment of the present invention.

In FIG. 5, a DoS mitigating device 510 is shown connected to network operations center 420, mitigating device 430, status server 440, and log server 450 which were discussed above in FIG. 4. DoS mitigating device 510 is also connected to a first router 513, an IP traffic 515, and a second router 517. DoS mitigating device 510 is similar to DoS mitigating devices 120, 125, 130, and 135 discussed above in FIGS. 1, 2 and 3.

Unlike DoS detecting device 410 which may receive packets on a regular basis, DoS mitigating device 510 may receive packets when a DoS attack occurs. This means that packets may be delivered to DoS mitigating device 510 when they are re-routed to DoS mitigating device 510 by first router 513. First router 513 may operate with other routers and devices to re-route traffic when a DoS attack is presumed. When this occurs, IP traffic 515, similar to IP traffic 460, is routed to DoS mitigating device 510 where packets are filtered, removed, or cleaned. DoS mitigating device 510 routes the cleaned packets to second router 517 destined for customer 170. Although connections between DoS mitigating device 510 and other devices are shown in FIG. 5, there may be other intermediary devices involved to transmit packets to their final destination.

One of ordinary skill in the art may note that DoS mitigating device 510 may be the same as mitigating device 430 in terms of hardware. As discussed above, mitigating device 430 may store profiles and configurations for particular customers connected to private network 105. When a DoS attack occurs, mitigating device 430 sends the instructions using the devices in management center 160 communicating with other DoS mitigating devices located in private network 105 to start the mitigation process to remove malicious or invalid packets that are attacking a customer's device or devices. Mitigating device 430 communicates with other devices in management center 160 to provide dynamically changing instructions. For example, if more mitigation is needed, mitigating device 430 may send the instructions for additional DoS mitigating devices to aid in the mitigation effort. Alternatively, mitigating device 430 may send instructions to reduce the mitigation effort or to cease the effort altogether. It is important to note that mitigating device 430 may use the same DoS mitigating device to reduce or stop a DoS attack for different customers. In this way, customers share DoS mitigating devices rather than have a DoS mitigating device dedicated to one customer. An advantage of this configuration is that multiple DoS mitigating devices may be used to thwart a DoS attack even when the attack has exceeded the capacity of one DoS mitigating device. As capacity is exceeded, more DoS mitigating devices may be activated to fight the DoS attack rather than have a situation where a customer-dedicated DoS mitigating device goes into overload when the capacity is exceeded at the customer-dedicated DoS mitigating device.

Figure 7:
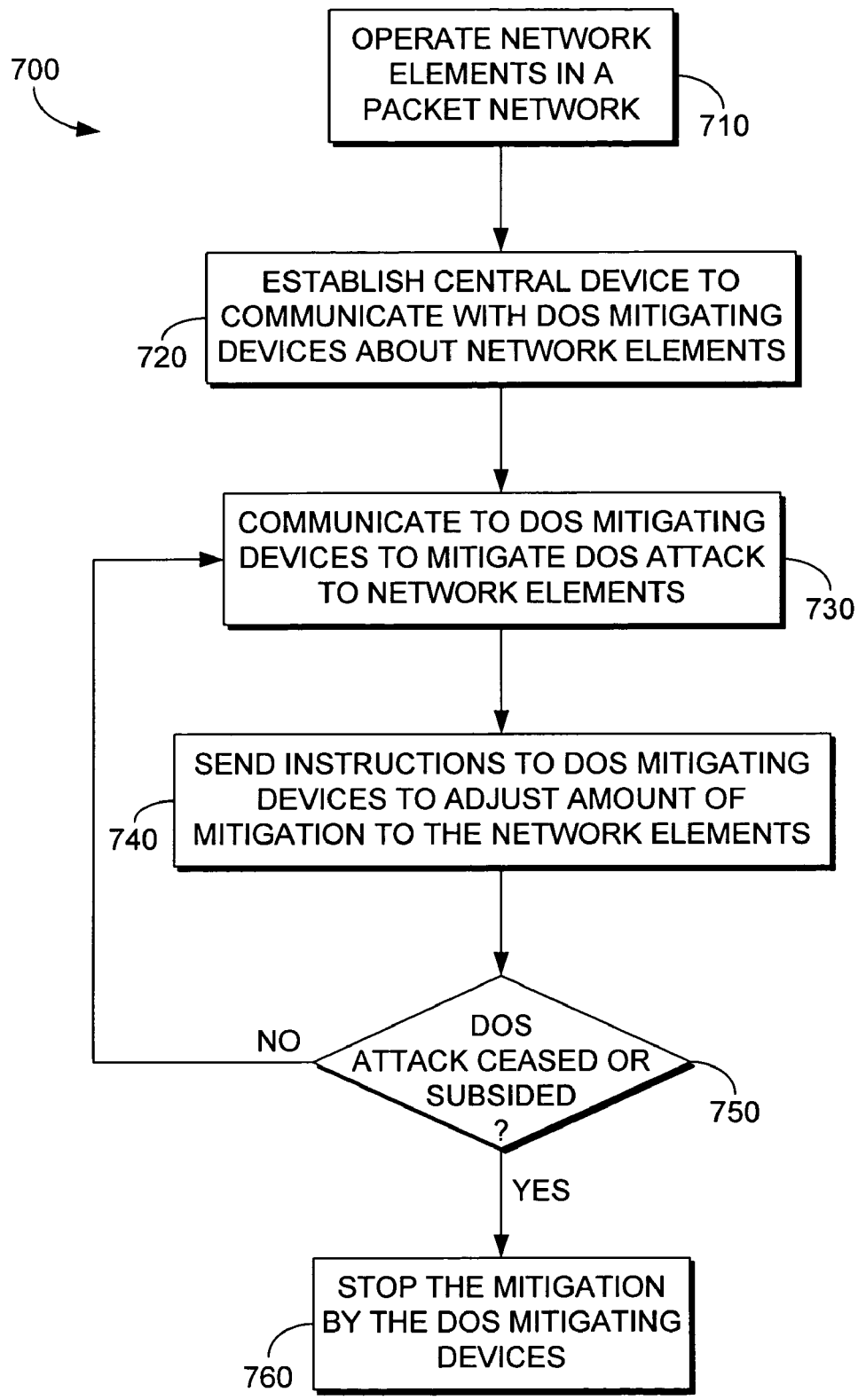
FIG. 7 is a flowchart illustrating an exemplary operating process for mitigating a DoS attack in accordance with an embodiment of the present invention.

In FIG. 7, a method for mitigating a DoS attack is shown in method 700. In method 700, network elements are operating in a packet network in a step 710. As discussed above, network elements are the customer devices in customer 170 connected to private network 105. A central device is established to communicate with DoS mitigating devices regarding network elements in a step 720. The central device may be identified by central device 165 discussed above in FIGS. 1, 2, and 3. DoS mitigating devices may identified by DoS mitigating devices 120, 125, 130, 135, and 510 discussed above in the various figures.

In a step 730, central device 165 communicates to DoS mitigating devices 120, 125, 130, and 135 with instructions to mitigate a DoS attack to network elements located in customer 170. As the DoS attack progresses, central device 165 may send instructions to DoS mitigating devices 120, 125, 130, and 135 to adjust the amount of mitigation to the network elements as shown in a step 740. During this process, information may be provided to central device 165 to provide an update on the DoS attack. Devices in management center 160 along with central device 165 may operate together to determine if the DoS attack has ceased or subsided in a step 750. If the DoS attack has not ceased or subsided, central device 165 may continue to provide instructions to DoS mitigating devices to mitigate the situation. One of ordinary skill in the art may visually appreciate the situation in the following form: Central device 165 may be located in Maryland while customer 170 may be located in Texas. Central device 165 may communicate with DoS mitigating device 120, located in California, and DoS mitigating device 125, located in Illinois, to start mitigation of a DoS attack on customer 170. The question becomes why would DoS mitigating devices located remotely from the customer be used to thwart a DoS attack. In implementing an embodiment of the present invention, the answer lies in the origin of the DoS attack, especially for DDoS attacks. The present invention uses a shared model to dynamically update DoS mitigating devices from a central location to start mitigation closer to the source of the DoS attack rather than allow the malicious or invalid packets to traverse private network 105 before beginning the mitigation. It is presumed to better start the mitigation as early as possible rather than wait at the destination to start the mitigation. Continuing with the current example, central device 165 may provide an additional DoS mitigating device 135 to support DoS mitigating devices 120 and 125. One may note that once a DoS attack has been identified, routers may be used to deliver packets to any destination including a destination not in proximity of a customer.

Going back to FIG. 7, in step 750, if the DoS attack ceases or subsides, the mitigation effort may stop as identified in a step 760. In this case, devices may return to their normal operations and allow packets to traverse the network under normal conditions.

Figure 8:
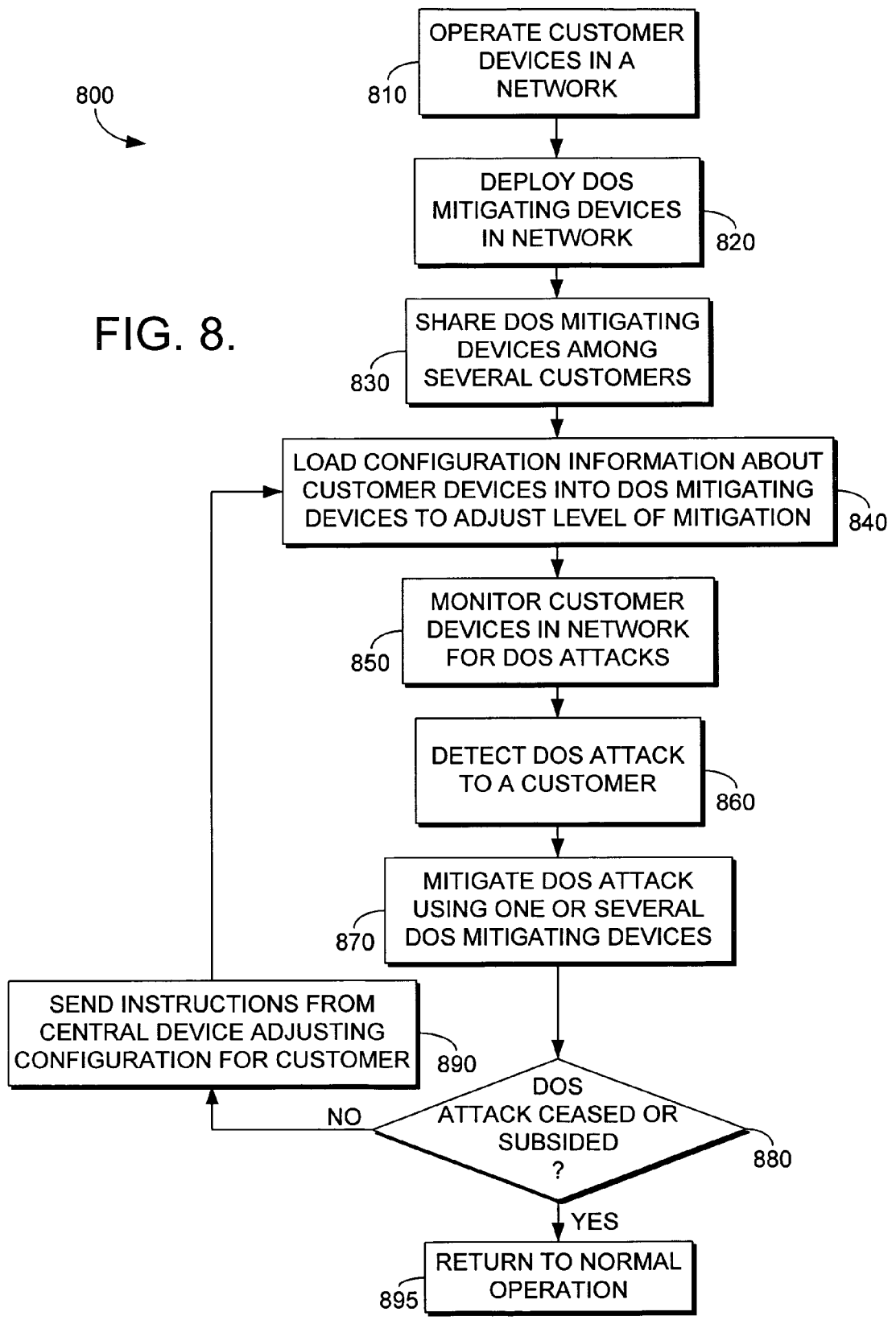
FIG. 8 is a flowchart illustrating an exemplary operating process for sharing DoS mitigating resources in accordance with an embodiment of the present invention.

Referring now to FIG. 8, a method for sharing DoS mitigating resources is shown in method 800. One of ordinary skill in the art may find similarities between the disclosed method 700 in FIG. 7 and method 800 in FIG. 8. Similar to FIG. 7, customer devices are operating in a network in a step 810 as a start of the process. DoS mitigating devices are deployed across the network in various locations in a step 820. The network may be small or large and may include locations that are great distances from each other. Wherever the DoS mitigating devices are located, they are not dedicated to a particular customer but share the workload to mitigate potential DoS attacks to several customers as shown in a step 830.

In a step 840, configuration information about various customers are loaded into the DoS mitigating devices. As discussed above, the configuration information provides instructions as to the amount of mitigation to perform during a DoS attack. The configuration information is adjusted based upon feedback information delivered to management center 160 including central device 165 discussed above.

During operation, customer devices, like those discussed in customer 170, are monitored for potential DoS attacks. The monitoring may involve sampling packets or using DoS detecting devices that may look at some or all the packets in the network. With either setup, a DoS attack may be detected as shown in a step 860. DoS mitigating devices go into action along with central device 165 to mitigate the DoS attack as shown in a step 870.

Like step 750 in FIG. 7, a determination is made if the DoS attack has ceased or subsided in a step 880. If the answer is no, central device 165 sends instructions to the DoS mitigating devices to adjust configuration information for a particular customer or customers resulting in either an increase of the mitigation or a decrease of the mitigation. As discussed earlier, the instructions from central device 165 may increase the throughput of one DoS mitigating device or it may start the operation of additional DoS mitigating devices.

If the answer to the question in step 880 is yes, central device 165 and other devices operate to return all devices to normal operations in a step 895 which is similar to step 760 in FIG. 7.

The methods discussed above illustrate embodiments of the present invention with exemplary steps. The steps are not provided to connote a particular order of execution but merely to explain the present invention. Some of the steps may be executed in a different order than shown, such as step 750 in FIG. 7 may be executed before step 740. Also, step 740 may be placed in the feedback look to step 730. Likewise, step 870 in FIG. 8 may be executed before step 840.

From the foregoing it will be appreciated that, although specific embodiments of the present invention have been described herein for purposes of illustration, various modifications may be made without deviating from the spirit and scope of the invention. Accordingly, the invention is not limited except as by the appended claims.

The invention claimed is:

1. A method for mitigating distributed denial of service (DoS) attacks among network elements, comprising:
   deploying one or more DoS mitigating devices, shared among more than one customer, in the packet network in a distributed manner to intercept DoS traffic to mitigate DoS attacks to one or more network elements operating in the packet network;
   configuring the one or more DoS mitigating devices from a central location prior to a DoS attack;
   providing from the central location a user-configurable policy for each network element to the one or more DoS mitigating devices to establish an amount of mitigation to occur for each network element when the DoS attack occurs;
   storing the user-configurable policy in the one or more DoS mitigating devices;
   determining at least one of the one or more DoS mitigating devices is closest to one or more sources of the DoS attack;
   sending from the central location to the one or more DoS mitigating devices an adjustment of the user-configurable policy, wherein the adjustment includes a manipulation to support different needs of the more than one customer;
   adjusting the amount of mitigation to the DoS attack for each network element based on the adjustment of the user-configurable policy stored in the one or more DoS mitigating devices, wherein packets are re-routed into the DoS mitigating devices as determined by a service provider, based on a pre-arranged agreement with the more than one customer, or a combination thereof; and
   when detected in the packet network, starting the mitigation of the DoS attack to the one or more network elements by the at least one of the one or more DoS mitigating devices closest to the one or more sources of the DoS attack and in accordance with the one or more user-configurable policies.

2. The method of claim 1, wherein the network element is selected from the group including packet network device and packet communicating device.

3. The method of claim 2, wherein providing the user-configurable policy comprises communicating one or more instructions.

4. The method of claim 3, wherein the adjustment of the user-configurable policy comprises one or more changes to instructions.

5. The method of claim 4, wherein adjusting the amount of mitigation is selected from the group including increasing a number of packets to be analyzed, decreasing the number of packets to be analyzed, increasing the number of DoS mitigating devices to analyze packets, and decreasing the number of DoS mitigating devices to analyze packets.

6. The method of claim 5, wherein mitigating DoS attacks to the one or more network elements comprises reducing invalid packets delivered to the one or more network elements.

7. The method of claim 6, wherein a DoS mitigating device comprises a computing device to analyze and reduce invalid packets.

8. A method for sharing DoS mitigation resources among network elements, one or more DoS mitigating devices comprising:
   providing one or more central devices to communicate information about one or more network elements distributed across a packet network, wherein the one or more network elements are located in the packet network and are protected from a DoS attack, and wherein the information include configuration or profile information;
   configuring the one or more DoS mitigating devices, shared among more than one customer, from the one or more central devices prior to the DoS attack;
   storing the information in the one or more DoS mitigating devices;
   communicating from the one or more central devices to the one or more DoS mitigating devices in closest proximity to one or more sources of the DoS attack to mitigate the DoS attack of the one or more network elements; and
   sending instructions from the one or more central devices to the one or more DoS mitigating devices to adjust information stored therein to change an amount of mitigation provided by the one or more DoS mitigating devices to the one or more network elements, wherein the information includes a manipulation to support different needs of the more than one customer and further wherein packets are re-routed into the one or more DoS mitigating devices as determined by a service provider, based on a pre-arranged agreement with the more than one customer, or a combination thereof.

9. The method of claim 8, wherein the one or more network elements are selected from the group including packet network device and packet communicating device.

10. The method of claim 9, wherein communicating to the one or more DoS mitigating devices comprises communicating one or more instructions to the one or more DoS mitigating devices.

11. The method of claim 10, wherein a DoS mitigating device comprises a computing device to analyze and reduce invalid packets.

12. The method of claim 11, wherein providing one or more central devices comprise providing a set of computing devices.

13. The method of claim 11, wherein providing one or more central devices comprise providing one or more master DoS mitigating devices.

14. A method for notification of a DoS attack, comprising:
   providing one or more operations centers to communicate information about one or more network elements to one or more DoS detecting devices, shared among more than one customer and distributed across a packet network wherein the one or more network elements are selected from the group including a packet network device and a packet communicating device;
   sampling network traffic at the one or more network elements;

establishing one or more baselines of valid traffic respectively for the one or more network elements wherein the one or more baselines are communicated to the one or more operations centers;

receiving information at the one or more operations centers from the one or more DoS detecting devices about network traffic that does not fit the baseline occurring at the one or more network elements;

determining one or more sources of the network traffic that do not fit the baseline; and manipulating a mitigation amount for the one or more DoS detecting devices to support different needs of the more than one customer according to the received information, wherein packets are re-routed into DoS mitigating devices as determined by a service provider, based on a pre-arranged agreement with the more than one customer, or a combination thereof.

15. The method of claim 14, wherein a DoS detecting device comprises a computing device that analyzes packets.

16. The method of claim 15, wherein establishing one or more baselines of valid traffic comprises determining one or more ranges of valid packets.

17. The method of claim 16, further comprising notifying one or more computing devices to initiate remedial measures to reduce the DoS attack.

18. The method of claim 17, wherein providing an operations center comprises providing a set of computing devices.

19. The method of claim 17, wherein providing an operations center comprises providing a master DoS mitigating device.

20. A method for notification of a DoS attack, comprising:
providing one or more operations centers to communicate information about one or more network elements to one or more DoS detecting devices, shared among more than one customer and distributed across a packet network wherein the one or more network elements are selected from the group including a packet network device and a packet communicating device;

sampling network traffic at the one or more network elements to establish a baseline of valid traffic for each network element wherein the baseline is communicated to the one or more operations centers;

detecting network traffic that does not fit the baseline by the one or more DoS detecting devices;

providing information to the one or more operations centers that the one or more network elements are encountering network traffic that does not fit the baseline;

determining one or more sources of the network traffic that do not fit the baseline; and manipulating a mitigation amount for the one or more DoS detecting devices to support different needs of the more than one customer according to the received information, wherein packets are re-routed into DoS mitigating devices as determined by a service provider, based on a pre-arranged agreement with the more than one customer, or a combination thereof.

21. The method of claim 20, wherein a DoS detecting device comprises a computing device to analyze packets.

22. The method of claim 21, wherein the baseline of valid traffic comprises one or more ranges of valid packets.

23. The method of claim 22, wherein providing information to the one or more operations centers that the one or more network elements are encountering network traffic that does not fit the baseline comprises providing information to the one or more operations centers that the one or more network elements are encountering invalid packets.

24. The method of claim 23, further comprising notifying one or more computing devices to initiate remedial measures to reduce the DoS attack.

25. The method of claim 24, wherein providing an operations center comprises providing a set of computing devices.

26. The method of claim 24, wherein providing an operations center comprises providing a master DoS mitigating device.

27. A system for mitigating distributed DoS attacks among network elements, comprising:
one or more DoS mitigating devices, shared among more than one customer, operable in a packet network to receive configuration instructions from a central device prior to a DoS attack, to determine one or more sources of the DoS attack to one or more network elements, to intercept DoS traffic with one or more DoS mitigating devices in closest proximity to the one or more sources of the DoS attack to mitigate the DoS attack, to store one or more user-configurable policies respectively associated with the one or more network elements wherein a user-configurable policy comprises an amount of mitigation a network element receives during the DoS attack, and to share a workload of mitigating DoS attacks with one or more other DoS mitigating devices according to the mitigation needs of the more than one customer, wherein the one or more network elements are located in the packet network and are protected from the DoS attack, and further wherein packets are re-routed into the one or more DoS mitigating devices as determined by a service provider, based on a pre-arranged agreement with the more than one customer, or a combination thereof.

28. The system of claim 27, further comprising the DoS mitigating device communicating with the central device wherein the central device is operable to send instructions to the DoS mitigating device to provide an amount of mitigation to the one or more network elements.

29. The system of claim 28, wherein the one or more network elements are selected from the group including packet network device and packet communicating device.

30. The method of claim 29, wherein the user-configurable policy comprises one or more instructions.

* * * * *